United States Patent
Balasubramanian et al.

(10) Patent No.: US 10,909,865 B2
(45) Date of Patent: Feb. 2, 2021

(54) SYSTEM AND METHOD TO IDENTIFY, DEPICT AND ALERT DISTRESS AND SPECIAL TRAFFIC BASED ON AT LEAST SQUAWK CODES

(71) Applicant: HONEYWELL INTERNATIONAL INC., Morris Plains, NJ (US)

(72) Inventors: Jayasenthilnathan Balasubramanian, Karnataka (IN); Saravanakumar Gurusamy, Tamil Nadu (IN); Roger W. Burgin, Scottsdale, AZ (US); Vamsi K Gundluru, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 3 days.

(21) Appl. No.: 16/268,687

(22) Filed: Feb. 6, 2019

(65) Prior Publication Data
US 2020/0251002 A1  Aug. 6, 2020

(51) Int. Cl.
*G08G 5/04* (2006.01)
*B64D 43/00* (2006.01)
*G01C 23/00* (2006.01)
*G08G 5/00* (2006.01)

(52) U.S. Cl.
CPC .............. *G08G 5/045* (2013.01); *B64D 43/00* (2013.01); *G01C 23/00* (2013.01); *G08G 5/0008* (2013.01); *G08G 5/0021* (2013.01)

(58) Field of Classification Search
CPC ....................................................... G01S 13/93
See application file for complete search history.

(56) References Cited

U.S. PATENT DOCUMENTS

| 6,262,679 B1 * | 7/2001 | Tran ...................... G01S 13/933 342/29 |
| 8,350,753 B2 | 1/2013 | Pal et al. |
| 9,142,133 B2 | 9/2015 | Palanisamy et al. |

(Continued)

FOREIGN PATENT DOCUMENTS

EP    2485206 A1    8/2012

OTHER PUBLICATIONS

Lachapelle, G. et al, GPS Versus LORAN-C for Vehicular Navigation in Urban and Mountainous Areas, IEEE VNIS93, Ottowa, Oct. 12-15, 1993, pp. 1-4 (Year: 1993).*

(Continued)

*Primary Examiner* — Nabil H Syed
*Assistant Examiner* — Cal J Eustaquio
(74) *Attorney, Agent, or Firm* — Lorenz & Kopf, LLP

(57) ABSTRACT

A method and system for identifying and displaying alerts of air traffic by receiving input data to a processor of an aircraft wherein the input data comprises: distress, emergency, and special traffic data; generating, by a graphic device coupled to the processor, restricted and unrestricted airspace about the aircraft based the input data; displaying, by the graphic device, the restricted and unrestricted airspace on a display of the aircraft to view on a traffic map the restricted and unrestricted airspace for navigating the aircraft; and generating, by a graphic device coupled to the processor, restricted and unrestricted airspace about the aircraft based on the input data from an aircraft transponder, an emergency locator beacon and an ADS-B emitter.

16 Claims, 8 Drawing Sheets

(56) References Cited

U.S. PATENT DOCUMENTS

| | | | |
|---|---|---|---|
| 2003/0036827 A1* | 2/2003 | Murphy | G01C 11/02 |
| | | | 701/3 |
| 2005/0219113 A1* | 10/2005 | Rowlan | G08G 5/0078 |
| | | | 342/29 |
| 2009/0073024 A1* | 3/2009 | King | G08G 5/0052 |
| | | | 342/30 |
| 2009/0140925 A1* | 6/2009 | Smith | G01H 17/00 |
| | | | 342/454 |
| 2010/0283661 A1* | 11/2010 | Strain | G01S 5/0072 |
| | | | 342/30 |
| 2012/0001788 A1 | 1/2012 | Carlson et al. | |
| 2012/0182161 A1 | 7/2012 | Rutherford et al. | |
| 2015/0212782 A1 | 7/2015 | Samuthirapandian et al. | |
| 2017/0018194 A1 | 1/2017 | Maji et al. | |
| 2018/0218621 A1 | 8/2018 | Canale | |
| 2018/0366012 A1 | 12/2018 | Glatfelter | |

OTHER PUBLICATIONS

Bailey, Tony; "All About Mode S Transponders"; Apr. 2005, Avionics News, pp. 44-48. (Year: 2005).*

* cited by examiner

SYSTEM AND METHOD TO IDENTIFY, DEPICT AND ALERT DISTRESS AND SPECIAL TRAFFIC BASED ON AT LEAST SQUAWK CODES

TECHNICAL FIELD

The present invention generally relates to aircraft systems, and more particularly relates to identifying, depicting and sharing alerts of distress and special traffic on in a display based on discrete transponder codes known as squawk codes of an aircraft while in-flight in response to an in-flight situation or action.

BACKGROUND

Often in an emergency or a distress in-flight situation or for that matter an expected or unexpected flight plan action, pilots are either not able to, or fail to, properly communicate necessary information to ground personnel and surrounding likely affected air traffic. The use by the pilots of the emergency, distress and other transponder squawk codes in such situations has proven to be an effective mechanism to both notifying ground personnel (i.e. air traffic control) and neighboring air traffic to be kept apprised of the situation and the aircraft in-flight status; and to evaluate a change of status because of an emergency or distress condition. In addition, the in-flight aircraft displays have also become more sophisticated and are relied on more by flight crews to combat mistakes and to provide flight crews with real-time visual representations of aircraft control and status, and for on-display communications with surrounding air traffic and ground personnel. As a result, such displays have become effective visual tools for controlling aircraft, reducing pilot workload, increasing situational awareness, and improving overall flight safety. The traffic display presents the pilot with relative positions of neighboring aircraft during flight without voice communications. The position of the neighboring traffic is determined based on Automatic Dependent Surveillance-Broadcast (ADS-B) messages received by the aircraft. The display of squawk codes in-cockpit on-display easily fits into the reliance and use by flight crews on visual display tools for notifications of neighboring aircraft.

Further, the United States Federal Aviation Administration (FAA) will begin (in 2020) to require that all aircraft include an Automatic Dependent Surveillance-Broadcast (ADS-B) system onboard. The ADS-B repetitively broadcasts information about itself to both the air traffic control (ATC) system and any other aircraft within the vicinity of the broadcasting aircraft. The broadcast information includes, among other items an assigned transponder code. The transponder code is a four digit numbers transmitted by the transponder in an aircraft in response to a secondary surveillance radar interrogation signal to assist air traffic controllers in traffic separation. The transponder code (often called a squawk code) is assigned by air traffic controllers to uniquely identify an aircraft. The squawk code allows easy identification of an aircraft on radar. The transponder code of an aircraft can be changed in response to a status change of the aircraft and is broadcasted (via the ADS-B) to neighboring traffic to provide information of a current aircraft status. The current Cockpit Display of Traffic Information (CDTI) display does not highlight aircraft with emergency and special codes. For example, if an aircraft has lost radio communications (Code 7600) or has been hijacked (Code 7500), none of the neighboring aircraft are notified of the distress or emergency status of the aircraft based on a change of a transponder code and this can affect the flight path of the neighboring aircraft.

It is desirable to provide systems and methods that depict alert and distress related information on-screen on a display corresponding to a particular discrete transponder code (i.e. squawk code) entered and/or changed of an aircraft to provide enhanced situational awareness to the flight crew and also to notify other aircraft and ground personnel via the ADS-B broadcast by highlighting using on-screen graphics and colors to accentuate a current situation, especially an emergency or distress situation, of an aircraft and provide automated perimeter information on-screen in a particular flight region for the aircraft to improve safety of air traffic in the vicinity.

Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method for flight control with alerts depicted on a display device is provided. The method includes: receiving, by a processor of a host aircraft, data of at least a state of a neighboring aircraft wherein the neighboring aircraft state data comprises: transponder data; identifying, by the processor, a transponder code from the transponder data of the neighboring aircraft by using a transponder table that includes a plurality of locally stored transponder codes; determining, by the processor, at least perimeter data about the neighboring aircraft by identifying the transponder code associated with at least perimeter data from the transponder code table wherein each transponder code is designated with a particular perimeter about an aircraft in accordance with the transponder code; generating, by the processor, a perimeter from the perimeter data about the neighboring aircraft for the transponder code wherein the perimeter defines restricted airspace about the neighboring aircraft; displaying, by the processor, on an air traffic map of a display device of the host aircraft, the neighboring aircraft with the perimeter displayed about the neighboring aircraft; processing state data of the host aircraft and the perimeter about the neighboring aircraft to identify a conflict between a trajectory of the host aircraft and restricted airspace about the neighboring aircraft; and selectively modifying one of the set including: a flight plan, a flight path, and a speed of the host aircraft responsive to identifying the conflict between a trajectory of the host aircraft and the restricted airspace defined by the perimeter about the neighboring aircraft.

The method, further includes: displaying, by the processor on the display device of the host aircraft, the air traffic map including: labels based on the transponder code associated with the host aircraft and the neighboring aircraft. The method, further includes: determining, by the processor, at least perimeter data based on data from an emergency locator beacon about the state of the neighboring aircraft instead by the transponder data. The method, further includes: determining, by the processor, at least perimeter data based on data from an ADS-B emitter category about the state of the neighboring aircraft instead of by the transponder data. The method, further includes: creating, by a graphic device, the perimeter about the neighboring aircraft wherein the graphic device is coupled the processor to receive instructions for creating the perimeter and the display device for displaying the perimeter about the neighboring aircraft.

The method, further includes: creating, by the graphic device, a symbol for each aircraft of a particular color and shape for visually distinguishing air traffic on the display device. The method, further includes: determining, by the processor, at least perimeter data based on data from one of a set of inputs including: the transcoder data, an emergency locator beacon data, and an ADS-B emitter category data for displaying a perimeter in accordance with an input data about each aircraft on the display device. The method, further includes: generating a larger perimeter about each aircraft when data from an antiquated emergency locator beacon is used as apposed when data from a newer emergency locator beacon is used because the data from the antiquated emergency locator beacon is less accurate than the data from the newer emergency locator beacon.

In another embodiment, a display system for an aircraft is provided. The display system includes: a display device; a graphics device coupled to the display device for generating, on the display device, perimeters about an aircraft, an icon for an aircraft and a label for the aircraft; and a control module operationally coupled to the display device and the graphics device, the control module configured to: receive aircraft state data from aircraft sensors; receive input data from a transponder of the aircraft; process the aircraft state data and the transponder data to instruct the graphics device to generate at least a perimeter about the aircraft based on the transponder data wherein the transponder data comprises transponder codes.

The display system, further includes: the control module configured to: instruct the graphic device to generate on the display device a label based on the transponder code for the aircraft. The display system, further includes: the control module configured to: receive the input data which include: emergency locator beacon data instead of the transponder data; and instruct the graphic device to generate on the display device a perimeter about the aircraft based on data from the emergency locator beacon for the aircraft. The display system, further includes: the control module configured to: receive input data which include: ADS-B emitter category data instead of the transponder data; and instruct the graphic device to generate on the display device a perimeter about the aircraft based on the ADS-B emitter category data for the aircraft.

The display system, further includes: the control module configured to: instruct the graphic device to generate an icon and a label for the aircraft on the display device based on the input data of an emergency locator beacon wherein the icon and the label visually reflect the input data from the emergency location beacon on the display device. The display system, further includes: the control module configured to: instruct the graphic device to generate an icon and a label for the aircraft on the display device based on the input data of the ADS-B emitter category data wherein the icon and the label visually reflect the input data from the ADS-B emitter. The display system, further includes: the control module configured to: instruct the graphic device to generate a larger perimeter about the aircraft when the input data is from an older model of the emergency locator beacon and a smaller perimeter about the aircraft when the input data is from a newer model of the emergency locator beacon to account for a lesser degree of accuracy of a location from the older model of the emergency locator beacon.

In yet another embodiment, a method for identifying and displaying alerts of air traffic is provided. The method includes: receiving an input data to a processor of an aircraft wherein the input data includes: distress, emergency, and special traffic data; generating, by a graphic device coupled to the processor, restricted and unrestricted airspace about the aircraft based the input data; and displaying, by the graphic device, the restricted and unrestricted airspace on a display of the aircraft to view on a traffic map the restricted and unrestricted airspace for navigating the aircraft.

The method, further includes: generating, by a graphic device coupled to the processor, restricted and unrestricted airspace about the aircraft based on the input data from an aircraft transponder. The method, further includes: generating, by a graphic device coupled to the processor, restricted and unrestricted airspace about the aircraft based on the input data from an emergency locator beacon. The method, further includes: generating, by a graphic device coupled to the processor, restricted and unrestricted airspace about the aircraft based on the input data from an ADS-B emitter. The method, further includes: processing the transponder data by the graphic device to generate a range, a symbol, and a label for the aircraft on the display of the traffic map.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

Figure 1:
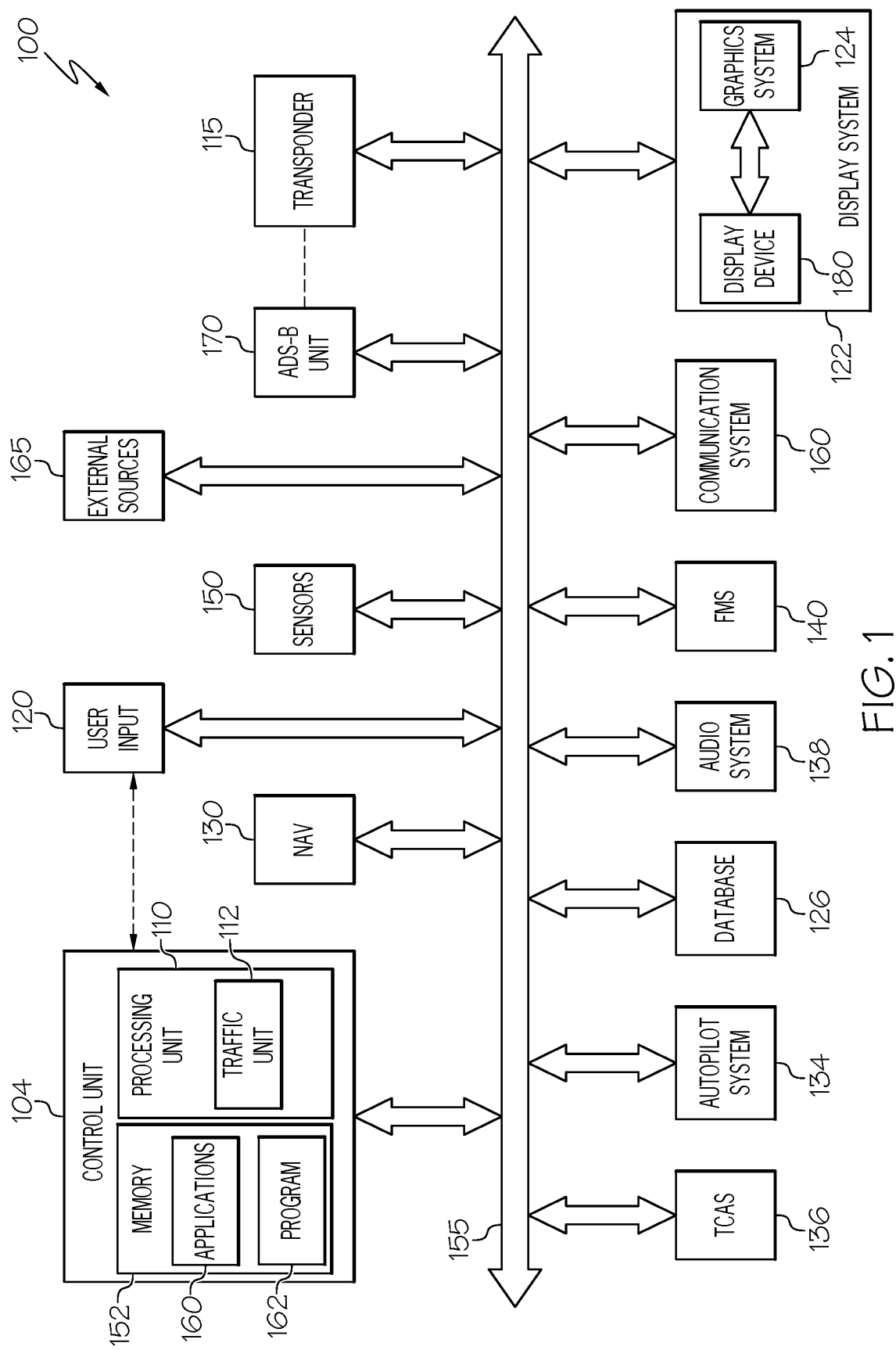
FIG. 1 is a functional block diagram of a squawk code display system in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a processing unit (FIG. 1, 110), and may be separate from, or integrated within, a preexisting mobile platform management system, avionics system, or aircraft flight management system (FMS).

Various exemplary embodiments described herein provide aircraft systems and methods that monitor and display traffic information. The Next Generation Air Transportation System (NexGen) overhaul of the United States airspace system and the companion Single European Sky ATM Research (SESAR) overhaul of the European airspace system creates various broadcast mechanisms to improve air traffic management on these continents by transitioning away from a traditional reliance on radar surveillance in restricted airspace toward primary Automatic Dependent Surveillance-Broadcast (ADS-B) functionality. The ADS-B uses global positioning system (GPS) and the FAA is requiring in the near future third generation GPS equipment to be delivered in the commercial and military aerospace to provide robust data for use in air traffic management.

In various exemplary embodiments, it is desirable to provide a methods and systems to notify immediately based on a change of a transponder code of an aircraft, the current status of the aircraft to ground personnel, air traffic control and neighboring aircraft to ensure proper communication and immediate response especially if an exigency in-flight situation is unfolding.

In various exemplary embodiments, it is desirable to provide automated perimeter information to neighboring aircraft and to air traffic control based on a change of a transponder code of an aircraft without the need for pilots and air traffic control to make such determinations based on personal subjective judgements and not based on empirical and application based solutions that are likely more reliable and optimum due in part to testing and statistical determinations. In addition, under exigency circumstances subjective judgements of the flight crew can easily be compromised due to the stress of the moment and this does not lend itself to optimum decision making such as the size of a perimeter border for restricted space of an aircraft experiencing a distress or emergency situation; hence it is desirable to provide automatic mechanisms for perimeter size determinations.

It is desirable to provide automated notifications to neighboring aircraft to save time and provide more exact communications of the exigency experienced in-flight by an aircraft without the need of additional communicative steps by the flight crew.

It is desirable to provide on-screen notification to air traffic control and neighboring aircraft as visual notifications which are an effective way to ensure the distress or emergency notifications are received timely.

FIG. 1 is a block diagram of the squawk code display system ("system") 100 in accordance with an exemplary embodiment. It should be understood that FIG. 1 is a simplified representation of the system 100 for purposes of explanation and ease of description. Further exemplary embodiments of the system 100 may include additional or other devices and components for providing further functions and features. The system 100 can be utilized in an aircraft, such as a helicopter, airplane, or unmanned vehicle. Moreover, exemplary embodiments of the system 100 can also be utilized in spacecraft, ships, submarines, and other types of vehicles. For simplicity, exemplary implementations are described below with reference to "aircraft."

As described below, the system 100 is particularly useful during flight to monitor other aircraft (e.g., "traffic") in the vicinity of the aircraft. In one exemplary embodiment, the system 100 is typically housed and implemented on the own-ship aircraft to enable an operator to monitor other aircraft within a broadcast range, although one or more components may also be located external to the aircraft. Generally, unless otherwise noted, the term "aircraft" refers to the own-ship aircraft associated with the aircraft system 100

As shown in FIG. 1, the system 100 includes a processing unit 110, a transponder 115, a database 126, a navigation system 130, a flight management system (FMS) 140, sensors 150, a communication unit 160, an ADS-B unit 170, a TCAS 136, memory 152 storing instructions and programs 162, user input device 120, graphics system 124 and a display device 180 coupled together in any suitable manner, such as with a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. Additional details about the function and operation are provided below after a brief introduction of the components of the system 100.

The processing unit 110 may be a computer processor associated the various aircraft functions discussed below. In one exemplary embodiment, the processing unit 110 functions to at least receive and/or retrieve aircraft flight management information (e.g., from the flight management system 140), navigation and control information (e.g., from the navigation system 130), and target, terrain, and/or traffic information (e.g., from the database 126, sensors 150, communication unit 160, and/or ADS-B unit 170). As introduced above and discussed in further detail below, the processing unit 110 includes a traffic unit 112 that monitors and evaluates traffic information, and as appropriate, initiates messages to air traffic control (ATC), and presents information associated with the traffic to the operator, e.g., in the form of a visual traffic display. Accordingly, the processing unit 110 may function as a graphics display generator to generate display commands based on algorithms or other machine instructions stored in the processing unit 110, database 126, or other memory components. The processing unit 110 then sends the generated display commands to display device 180 for presentation to the user.

Depending on the embodiment, the processing unit 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 110 includes processing logic that may be configured to carry out the functions, techniques, and processing tasks or methods associated with operation of the system 100. In one exemplary embodiment, the processing unit 110 is implemented with on-board logic to provide the functions described below in real-time to the aircraft operator. In other embodiments, one or more aspects may be located remotely and/or evaluated at a later time.

The system may include a user input device (e.g., user interface) 120 coupled to the processing unit 110 to allow a user to interact with the display device 180 and/or other elements of the system 100. The user interface 120 may be realized as a keypad, touchpad, keyboard, mouse, touch panel, joystick, knob, line select key or another suitable device adapted to receive input from a user. Speech recognition could also be used as an input device for recognition of exemplary voiced inputs from an user such as "SQUAWK HIJACK" and "IDENT" to indicate squawk codes if a "hijack" or "ident". In some embodiments, the user interface 120 may be incorporated into the display device 180, such as a touchscreen. In further embodiments, the user interface is realized as audio input and output devices, such as a speaker, microphone, audio transducer, audio sensor, or the like.

The database 126 is coupled to processing unit 110 and can be a memory device (e.g., non-volatile memory, disk, drive, tape, optical storage device, mass storage device, etc.) that stores digital landing, waypoint, target location, and terrain data as either absolute coordinate data or as a function of aircraft position that enables the construction of a synthetic or enhanced representation of the aircraft operating environment. The database 126 can additionally include other types of navigation and/or operational information relating to the evaluation and display of information. The data in the database 126 may be uploaded prior to flight or received from external sources, such as an airport and other aircraft transmissions and/or onboard sensors. As described below, the database 126 may be used to store aircraft traffic information received from various sources.

The navigation system 130 is configured to provide the processing unit 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight information.

The flight management system 140 supports navigation, flight planning, and other aircraft control functions, as well as provides real-time data and/or information regarding the operational status of the aircraft. The flight management system 140 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters.

The system 100 may include or otherwise receive information from one or more sensors 150. In one exemplary embodiment, the sensors 150 may include light sensing devices, such as a visible low light television camera, an infrared camera, and millimeter wave (MMW) camera. Other sensors 150 may include, as examples, radar, lidar, sonar, and/or weather sensors that may provide information to the system 100. In some embodiments, the sensors 150 may be incorporated into the navigation system 130, flight management system 140, or enhanced vision systems. As described below, the sensors 150 may particularly function to collect information about the position, nature, and arrangement of aircraft traffic during flight.

The communication unit 160 may be any suitable device for sending and receiving information to and from the system 100. In some embodiments, communication unit 160 may be configured to receive radio frequency transmissions, satellite communication transmissions, optical transmissions, laser light transmissions, sonic transmissions or transmissions of any other wireless form of data link. In one exemplary embodiment, the communication unit 160 is configured to send and/or receive information with air traffic control (ATC). As described below, the communication unit 160 may exchange automated or selected messages with air traffic control about traffic, either as text-based messages, voice communications, or other forms. The communication unit 160 may interpret received communications and present this information to the processing unit 110.

As previously noted, the ADS-B unit 170 is coupled to the processing unit 110. Generally, the ADS-B unit 170 functions as part of a cooperative surveillance mechanism for air traffic management and related applications. In one exemplary embodiment, the ADS-B unit 170 includes (or is coupled too) a transponder 115 that automatically and periodically transmits messages that include state vector data (e.g., flight information) for the broadcasting aircraft. Such aircraft state vectors may include, as examples, aircraft position, airspeed, altitude, intent (e.g., whether the aircraft is turning, climbing, or descending), aircraft type, and flight number. The aircraft state vectors may be provided to the ADS-B unit 170 for transmission as ADS-B messages or data by the processing unit 110 or other systems. The ADS-B unit 170 similarly receives ADS-B messages or data with state vectors from neighboring aircraft in a broadcast area and provides the received ADS-B messages to the processing unit 110 for evaluation and, as appropriate, additional action, as discussed below. In some embodiments, the ADS-B messages and data sent by the ADS-B unit 170 may be referenced as "ADS-B OUT" and the ADS-B messages and data received by the ADS-B unit 170 may be referenced as "ADS-B IN."

The system 100 also includes the display device 180 coupled to the processing unit 110. The display device 180 may include any device or apparatus suitable for displaying various types of computer generated symbols and flight information discussed above. Using data retrieved (or received) from the navigation system 130, flight management system 140, database 126, sensors 150, communication unit 160, and/or ADS-B unit 170, the processing unit 110 executes one or more algorithms (e.g., implemented in software) stored in memory 152 for determining the position of the various types of desired information on the display device 180. As noted above, the processing unit 110 then generates display commands to a graphics system 124 representing this data for displaying the data on the display device 180. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like. Additional details regarding the information displayed on the display device 180 are provided below.

As described below, the system 100 is particularly suitable for monitoring, evaluating, and presenting air traffic information to the operator during flight. During operation, the traffic unit 112 of the processing unit 110 may determine or otherwise receive the current position and energy parameters (e.g., altitude, track, etc.) of the aircraft (e.g., via the navigation system 130 or flight management system 140). The traffic unit 112 may also receive ADS-B messages and data from a neighboring aircraft (e.g., via the ADS-B unit 170). The traffic unit 112 is configured (i.e., processing unit 110 is loaded with, and operates, appropriate software, algorithms and/or sub-routines stored in memory 152) to evaluate the squawk codes, position and energy parameters of the other aircraft relative to the own-ship aircraft and to generate display commands for the display device 180 to render appropriate traffic information. The system 100 graphically displays the traffic information on the display device 180 to provide an accurate depiction of the other or neighboring aircraft within the vicinity of the own-ship aircraft based on the ADS-B messages and data.

The transponder 115 transmits four digit numbers which allows easy identification of aircraft on a radar. These four digit numbers are known as squawk codes and are four-digit octal numbers; because the dials on a transponder read from zero to seven, inclusive. Thus the lowest possible squawk is 0000 and the highest is 7777. The four octal digits can represent up to 4096 different codes. Certain codes can be selected by the flight crew, if an in-flight situation requires selection or allows for it based on a flight plan. In certain instance, permission from the air traffic control (ATC) is required, but this is not always the case. For example, during a distress or an emergency situation, the ATC permission is not required. For flights on instrument flight rules (IFR), the squawk code is typically assigned as part of the departure clearance and stays the same throughout the flight. The flights on visual flight rules (VFR), when in uncontrolled airspace, will "squawk VFR" (or conspicuity code in the UK, 1200 in the U.S., 7000 in Europe). Upon contact with an ATC unit, the flight crew will be told by ATC to squawk a certain unique code. When changing frequency, for instance because the VFR flight leaves controlled airspace or changes to another ATC unit, the VFR flight will be told to "squawk VFR" again. The below table 1.0 lists various transponder codes:

TABLE 1.0

| XPDR Code | Assigned Usage |
|---|---|
| 0000 | Shall not be used—is a non-discrete mode A code (Europe) Mode C or other SSR failure (UK) Should never be assigned (USA) |
| 0033 | Parachute dropping in progress (UK) |
| 1202 | Visual flight rules (VFR) glider operations for gliders not in contact with ATC |
| 1255 | Aircraft not in contact with an ATC facility while en route to/from or within the designated firefighting area(s) (USA) |
| 5000 | Aircraft flying on military operations (Australia) |
| 5000, 5400, 6100, 6400 | Reserved for use by NORAD (USA and Canada) |
| 5100-5300 | May be used by DOD aircraft beyond radar coverage but inside US controlled airspace with coordination as appropriate with applicable Area Operations Directorate (USA) |
| 7500 | Aircraft hijacking (ICAO, worldwide) |
| 7501-7577 | Reserved for use by Continental NORAD Region (CONR) (USA) |
| 7600 | Radio Failure (Lost Communications) (ICAO, worldwide) |
| 7700 | Emergency (ICAO, worldwide) |
| 7400 | Unmanned aircraft systems (UAS) lost control link between the aircraft and the pilot is lost. |

The transponder squawk codes are available in the ADS-B system generated Extended Squitter Aircraft Status Messages with TYPE subfield set to 28, the SUBTYPE field set to one of the Emergency/Priority status subfield in each such message set equal to the corresponding binary coding in the table shown below in Table 1.2 of the FAA DO-260 ADS-B compliance of the minimum operation performance standards (MOPS) for 1090 MHz ADS-B. By 2020, aircraft operating in controlled U.S. airspace will be required to carry equipment that transmits ADS-B messages. The FAA has published a mandate requiring ADS-B transmitters in many types of aircraft to take effect on Jan. 1, 2020.

TABLE 1.2

| EMERGENCY/PRIORITY STATUS | | |
|---|---|---|
| Coding (binary) | Coding (decimal) | Meaning (Emergency/Priority Status) |
| 000 | 0 | No Emergency |
| 001 | 1 | General Emergency |
| 010 | 2 | Lifeguard/medical |
| 011 | 3 | Minimum fuel |
| 100 | 4 | No Communications |
| 101 | 5 | Unlawful Interference |
| 110 | 6 | Reserved |
| 111 | 7 | Reserved |

Additional details regarding the operation and resulting display of the system 100 are provided as follows: Exemplary embodiments of the control module (FIG. 1, 104) for enhanced flight control, deliver a technological improvement over a conventional flight management systems as follows. Effectively, the control module 104 couples the TCAS 136 to the FMS 140 allowing access to the database (126) and the approach procedures and runway data therein. The TCAS data includes a neighboring aircraft's instantaneous position, bearing, range, and altitude. The TCAS may also be equipped with capabilities that results in the ability to evaluate the TCAS data early enough to potentially modify the own ship aircraft's flight plan (FP).

Although shown externally for distinction and discussion, the depicted control module 104 may be integrated within the FMS 132, thereby realizing an integrated flight management system, within system 100; however, the concepts presented here can be deployed in a variety of mobile platforms, spacecraft, and the like. Accordingly, in various embodiments, the control module 104 may reside elsewhere and/or enhance part of larger aircraft traffic awareness system, avionics management system, or flight control system.

In the illustrated embodiment, the control module 104 is configured to support communications via a communications link (not shown) between external data source(s) 165 and the aircraft. External source(s) 165 may include air traffic control (ATC), neighboring aircraft, or other suitable command centers and ground locations. The communications link may be wireless, utilizing one or more industry-standard wireless communication protocols. Non-limiting examples of data received from the external source(s) 165 includes, for example, instantaneous (i.e., real time or current) air traffic control (ATC) communications, traffic collision and avoidance system (TCAS) data from other aircraft, automatic dependent surveillance broadcast (ADS-B) data, and weather communications.

The Traffic Alert and Collision Avoidance System (TCAS) 136 may be a combination of hardware and software configured to monitor airspace around the aircraft (i.e. perimeter around aircraft) and communicate with neighbor traffic (external sources 165) found within the airspace around the aircraft that are also equipped to support TCAS 136. TCAS 136 employs a TCAS communication protocol that is independent from ground based communication. TCAS 136 is generally configured to support the TCAS communication protocol by employing a dedicated transponder 115. TCAS data includes a neighbor aircraft's instantaneous position, bearing, range, and altitude. TCAS 136 processes received TCAS data and other data with current aircraft state data and generates recommended evasive maneuvers.

The renderings of the display system 122 may be processed, at least in part, by the graphics system 124. In some embodiments, the graphics system 124 may be integrated within the control module 104; in other embodiments, the graphics system 124 may be integrated within the display system 122. Regardless of the state of integration of these subsystems, responsive to receiving display commands from the control module 104, the display system 122 displays, renders, or otherwise conveys one or more graphical representations or displayed images associated with operation of the aircraft 100, as described in greater detail below. In various embodiments, images displayed on the display system 122 may also be responsive to processed user input that was received via a user input device 120.

In various exemplary embodiments, the display system 122, is responsive to user input 120 or the assignment and/or the update of a transponder code. For example, upon an user entering a transponder code to the transponder 115, the display system 122 executes various applications (via the processing unit 110) to generate graphics by the graphic system 124 of icons, perimeter boundary and labels in various shapes, colors, fonts as desired or configured to be associated with the transponder codes of an aircraft or neighboring aircraft for display on the display device 180. For example, the graphics system 124 can display attributes associated with the transponder code on the display device 180 of restricted and non-restricted space for the aircraft to fly and for visual view by the pilot.

In various exemplary embodiments, the graphic system 124 can generate similar attributes of labels, perimeters, icons in different colors and shapes based on activation of a distress beacon or an emitter category of the ADS-B unit 170 instead of the transponder codes for display on the display device 180. That is, the graphics system 124 can layer graphic elements such as a perimeter boundary, a label, or a particular icon for an aircraft on a traffic display that is based not on the transponder code assigned to the aircraft but on a distress beacon or an emitter category of the ADS-B unit 170 to provide the pilot with similar viewing information such as, though not limited to, restricted and non-restricted airspace defined by the perimeter boundary about a neighboring aircraft. In addition, similar information may also be communicated and shared of the current state of the aircraft or a neighboring aircraft based on the distress beacon activation or the emitter category of the ADS-B unit 170.

The autopilot system 134 (also referred to as autopilot, or simply, AP) may be any combination of hardware and software. When engaged or activated, the autopilot system 134 processes current and instantaneous position and orientation information of the aircraft 100 and provides flight control guidance based thereon. In operation, flight control guidance may take the form of command and control of a flight control system (FCS, not shown) of the aircraft. In some embodiments, the autopilot system 134 also controls aircraft thrust. A pilot or crew may engage the autopilot via a user input device 120.

The control module 104 performs the functions of the system 102. As used herein, the flight plan (FP) is an initial plan for the aircraft's 100 travel, whereas the flight path is its trajectory at any given time. Having access to the FMS 140, the perimeter boundary information of air traffic, and to the TCAS 136, the control module 104 is able to "look ahead" at the future flight path of the host aircraft and change the FP, the flight path, or a speed of the aircraft to provide collision avoidance or flight into restricted airspace. In an example, the control module 104 processes the TCAS data, perimeter boundary data with the aircraft's FP, identifies a neighbor traffic with boundary perimeters that is in the way of a planned descent, and then modifies the FP by moving a planned top of descent. In another example, the control module 104 processes the TCAS data and the perimeter boundary (i.e. restricted airspace) with the aircraft's FP, identifies a neighbor traffic that includes restricted airspace which is in the way of a planned descent, and then modifies the flight path by delaying a planned descent until the event that the neighbor traffic surrounded by restricted airspace has cleared. In yet another example, the control module 104 processes the WAS data and the perimeter data about neighbor traffic with and without restricted airspace with the aircraft's FP, identifies a neighbor traffic that is in the way of a flight path, and then modifies a speed of the aircraft to avoid the neighbor traffic.

With continued reference to FIG. 1, within the control module 104, the processing unit 110 and the memory 152 (having therein the program 162) form a novel processing engine that performs the processing activities of the control module 104, in accordance with the program 162, as is described herein.

The memory 152 and the database 126 maintain data bits and may be utilized by the processing unit 110 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processing unit 110 (i.e. a processor). In the depicted embodiment, the memory 152 stores the above-referenced instructions and applications along with one or more configurable variables in stored variables 164.

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

During operation, the processing unit 110 loads and executes one or more programs, algorithms and rules embodied as instructions and applications contained within the memory 152 and, as such, controls the general operation of the control module 104 as well as the system 100. In executing the processing unit described herein, such as the method 200 of FIG. 2, the processing unit 110 specifically loads and executes the instructions embodied in the novel program 162. Additionally, the processing unit 110 is configured to, in accordance with the program 162 to process received inputs selectively of any combination of inputs from the set which may include: external data sources 165, inputs for the navigation system 130 with the autopilot system 134, sensors 150, TCAS 136, the user input device 120; and may reference any of the databases (such as, the navigation); and the display system 122 to generate display commands that command and control the display system 122.

Figure 2:
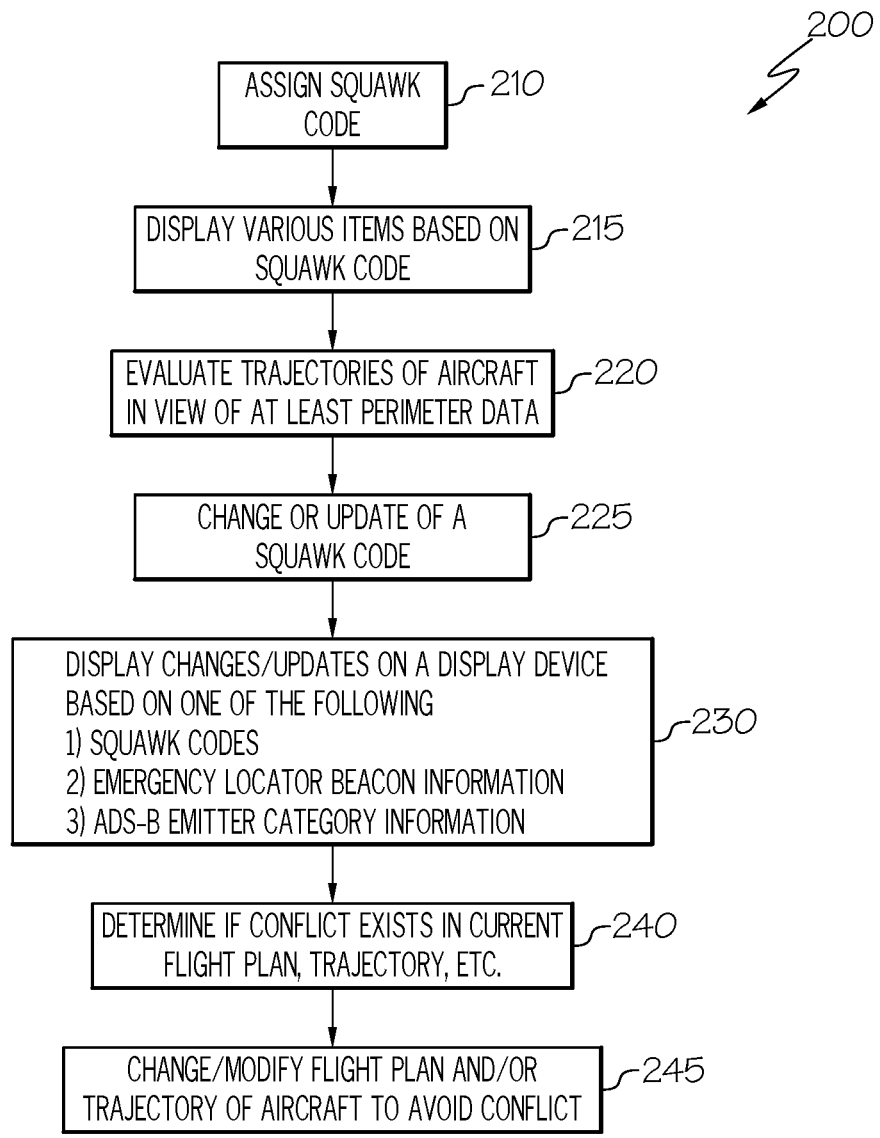
FIG. 2 is a flowchart diagram of the squawk code display system in accordance with an exemplary embodiment.

In a further exemplary embodiment, the control module 104 discussed above may be used to implement flight control method 200 in accordance with the display of the squawk code perimeter information and the restrictions in airspace that result in an aircraft flight path, as shown in the flow chart of FIG. 2. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact. Finally, the method 200 can be also implemented with respect to information displayed based on distress beacons or emitter categories from the ADS-B unit (FIG. 1, 170) associated with the host aircraft or neighboring aircraft.

The method begins with the system (FIG. 1, 100) initialized. As mentioned above, initialization may include uploading or updating instructions and applications (FIG. 1, 160), program (FIG. 1, 162), and the various lookup tables (i.e. table of transponder codes) stored in the database (FIG. 1, 120) that contain perimeter and display information for each squawk code in Table 1.0. Examples of parameters that may be stored in stored variables include parameters used by the instructions and applications in memory (FIG. 1, 152) and the program (FIG. 1, 162) and the like. Stored variables in memory (FIG. 1, 152) may also include various shapes, sizes, and color rendering references for flight images, boundaries and symbols for squawk codes and displays such as employed on a graphical user interface (GUI) displayed on the display system (FIG. 1, 122). In some embodiments, the program (FIG. 1, 162) includes additional instructions and rules for commanding various audio system (FIG. 1, 138) devices such as speakers and alarms for squawk codes particularly instances of use of distress or emergency squawk codes by an aircraft.

FIG. 2 is a flowchart of a method 200 of the squawk code display system in accordance with an embodiment. At 210, the host aircraft has input or been assigned a squawk code indicating the current aircraft status and begins receiving TCAS data. At 215, in an on-screen cockpit display and/or in an on-screen display of a computer device and/or mobile device, a label indicative of the entered squawk code is displayed; additional items may also be displayed: an associated color and a symbology with or without a perimeter boundary of the host aircraft is displayed on screen for a visual indicator of the host aircraft with a perimeter boundary (i.e. restricted space around the host aircraft) and a current status of the host aircraft for enabling other aircraft to change or to plan an appropriate flight trajectory or flight path to circumvent the perimeter boundary of the host aircraft if the flight trajectory or path is determined to interfere with the perimeter boundary displayed that is associated with the assigned squawk code of the host aircraft.

In various alternate exemplary embodiments, the on-screen display of the host aircraft may display perimeter boundary information of restricted space surrounding other aircraft for the host aircraft to plan an appropriate flight trajectory or flight path to circumvent the perimeter boundary to not interfere as required with the perimeter boundary defined by squawk codes assigned to other aircraft.

In another alternate exemplary embodiment, the on-screen display of the associated squawk code information may be continuous or intermittent depending on the squawk code entered. For example, if the squawk code is indicative of a distress or an emergency situation requiring caution and monitoring of aircraft in the vicinity, the display would be continuous and even further accentuated in the on-screen display by color, symbology and by a particular perimeter boundary graphic. Also, TCAS data (may include perimeter information associated with the squawk) received by the control module (FIG. 1, 104) for processing by the processing unit of flight plan or trajectory. This is because the TCAS is understood to be continually processing received neighbor traffic data to monitor a predetermined buffer zone around the host aircraft where the predetermined buffer zone can or must include the additional buffer zone generated by perimeter boundaries of other aircraft(s) as a result of an assigned squawk code to the other aircraft(s) in the vicinity or approximate to the current flight path of the aircraft resulting in a likelihood of interference of the current flight plan. At 215, the host aircraft takes off, beginning a flight. At 220, the control module (FIG. 1, 104) begins evaluating neighbor aircraft trajectories, to compare the trajectory of the host aircraft, based on the TCAS data, the additional (if any) squawk code perimeter boundary data of the host aircraft, and the perimeter boundary data of other aircraft with/without the added squawk code perimeter boundary. In addition, an autopilot system (FIG. 1, 134) may also be optionally engaged. An engaged autopilot system means that it is activated, or turned on and operating, and the autopilot system begins holding an aircraft attitude and would be responsive to any change in path from processing of the TCAS data received.

Throughout the performance of the method 200, aircraft state data, in particular, the position determining data, is continuously received. The method 200 also continuously processes the position determining data with the designated flight plan, to track the aircraft's progress on the flight plan and to determine interference of the flight path by perimeter boundaries of other aircraft or by the host aircraft of respective phases of flight and changes in the assigned squawk codes to the host and the other aircraft.

At 225, an aircraft in the vicinity, directly in the current flight path or indirectly in the flight path updates the assigned squawk code because of a distress or an emergency. At 230, the display of the host aircraft shows one or more on screen changes or updates of a change of symbology, color, perimeter data of the other aircraft. In various exemplary embodiments, the display can be configured to be based on information from emergency locator beacons and/or from ADS-B emitter categories. That is at 230, the display of alerts, perimeters about an aircraft, and labels can be generated based on data not only from the transponder (i.e. a lookup table or transponder codes with linked information) but also from emergency locator beacons and the ADS-B emitter categories defined. Further, the display can be configured so that the display based on information from the other entities, can be visually distinguishable by the labeling, color, symbology and perimeter/range shapes and configurations.

At 240, a determination is made whether there is a flight path conflict of the host aircraft or a flight path conflict may also be simple predicted in the near future (i.e., a conflict between a planned flight path of the host aircraft and a trajectory of a neighbor aircraft as a result of a change of the assigned squawk code of the host or neighbor aircraft or both), the control module (in FIG. 1, 104) proceeds to 245. At 245, any combination of: the flight plan, the flight path, or the speed, of the host aircraft or the neighboring aircraft may be selectively modified. In other embodiments, a prompt to the pilot seeks pilot approval before modifying the flight path at 245. It is to be understood that, due to access to the FMS data, the modified flight path at 245 is able to account for the aircraft FP intended path. The control module (in FIG. 1, 104) may also prevent aircraft trajectories that are close (ex. trajectories close enough to generate a TCAS resolution advisory by the TCAS) because of a closeness or likely interference with the perimeter boundary of either aircraft that has been changed due to a distress or an emergency or other situation. In some embodiments, there is an opportunity for a user to override or prohibit an automatic implementation of the evasive maneuver. An user override may be received at any point in the method 200, and may return the control of the host aircraft to the pilot.

Figure 3:
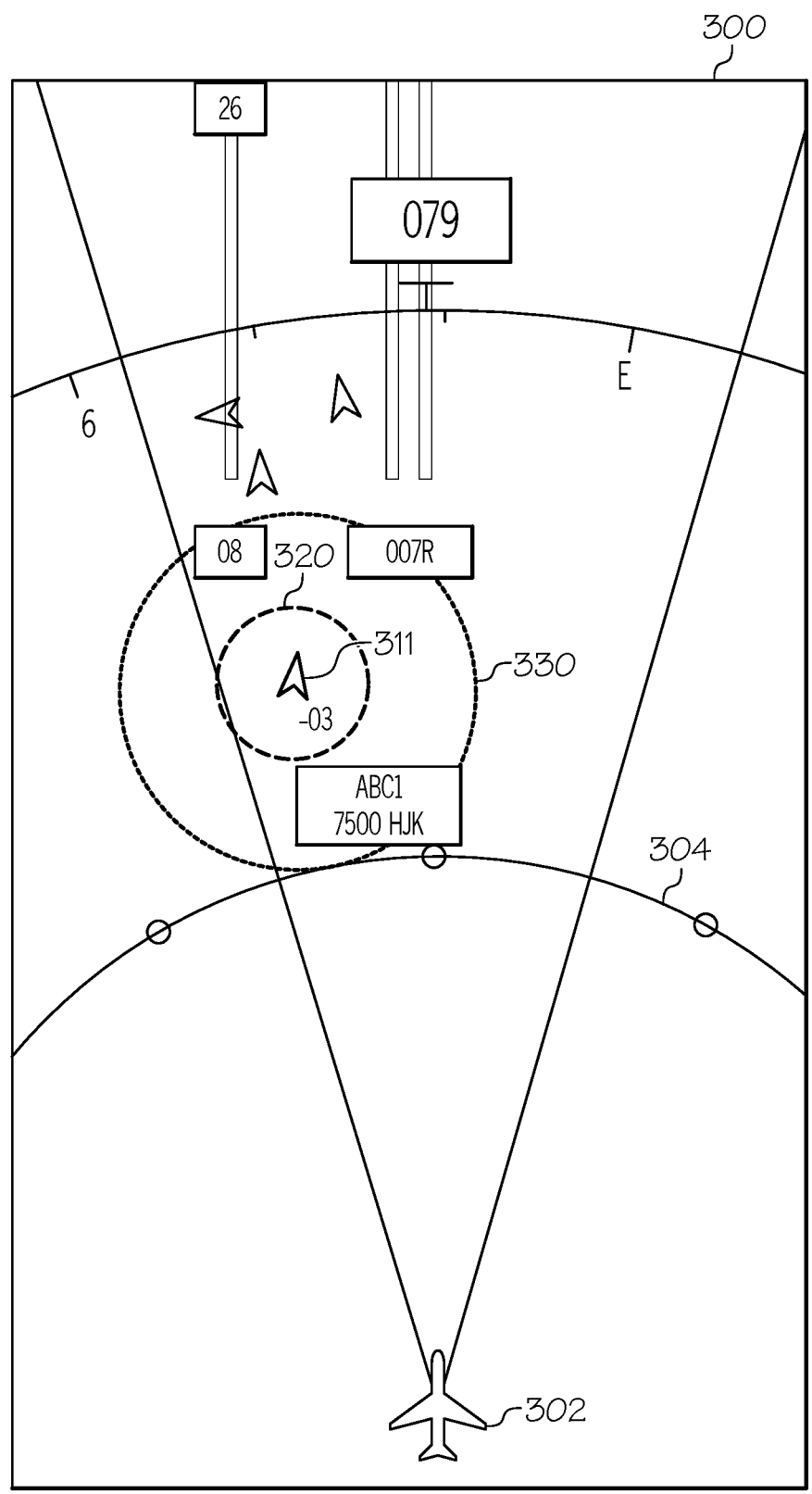
FIG. 3 is a traffic display rendered by the of the squawk code display system of FIG. 1 in a first scenario in accordance with an exemplary embodiment.

FIG. 3 is a traffic display rendered by the of the squawk code display system of FIG. 1 in a first scenario in accordance with an exemplary embodiment. In FIG. 3, the traffic display 300 is centered on an own-ship aircraft, represented by symbol or icon 302. One or more range rings 304 may be depicted to provide a distance or timing context. As shown, the traffic display 300 also includes symbology (e.g., in the form of a diamond icon) representing each aircraft that forms the traffic 311. In some embodiments, the traffic 311 corresponds to all instances of aircraft from which flight information was received. The traffic 311 on the traffic display 300 provides an indication to the operator of the respective positions of the other aircraft relative to the own-ship aircraft in real-time. In addition to position, the symbology representing the traffic 311 may include various types of information. In particular, the traffic 311 may include an aircraft ID, the relative altitude, and the change in relative altitude. For example, aircraft (icon of traffic 311), which has an aircraft ID of "ABC1," is positioned approximately 800 feet below the own-ship aircraft (as indicated by the "−08") and is moving vertically down (as indicated by the down arrow). Typically, the operator continuously monitors the traffic display 300 to maintain awareness about traffic 311. In addition, an outer ring 330 can be drawn to establish a possible safety zone. The dimensions of the ring can be varied depend on the criticality of the code. In an exemplary embodiment, for a glider type of aircraft not in contact with the ATC (Code 1202), the aircraft could be highlighted with a normal outer ring range and a corresponding aircraft color. In an alternate embodiment, an aircraft that is performing a function such as dropping parachutes (corresponding to UK code 0033, the squawk code) can be highlighted in a cyan color with a larger outer ring to provide maximum clearance for safety for each parachute jumpers. After the jump operation is completed, the UK code 0033 (i.e. the squawk) is changed back to a code indicative that the parachute dropping is no longer in progress and the highlighted ring can be changed from a cyan color and the larger outer ring would be reduced accordingly.

Figure 4:
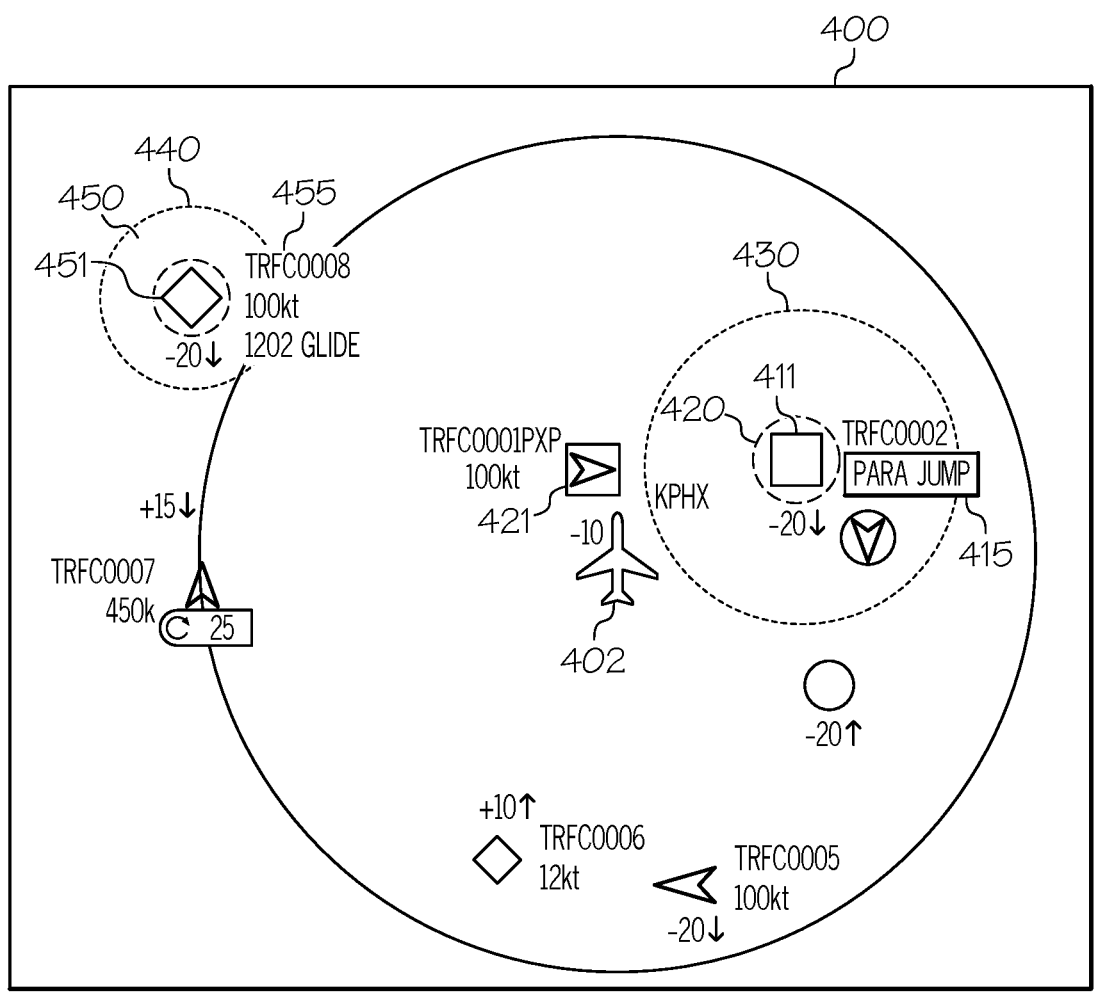
FIG. 4 is a traffic display rendered by the of the squawk code display system of FIG. 1 in a second scenario in accordance with an exemplary embodiment.

FIG. 4 is a traffic display rendered by the squawk code display system of FIG. 1 in a second scenario in accordance with an exemplary embodiment. In FIG. 4, a CDTI display 400 of an aircraft with special transponder (XPDR) codes in accordance with an embodiment is illustrated. In FIG. 4, the CDTI display 400 is centered on an own-ship aircraft, represented by symbol or icon for aircraft 402. As shown, the CDTI display 400 also includes symbology (e.g., in the form of a diamond icon) representing various aircraft. The other aircraft are represented with different symbology. The glider 455 is represented by a rhombus 451 in the inner boundary 450 in blue, the parachute jumper aircraft 415 with the parachute jumpers in progress is represented by a red filled in square 411. Each of the symbology of the aircraft 402, the glider 455 and the parachute jumper aircraft 415 as well as the other diamond icons represents the traffic on the CDTI display 400 and provides an indication to the operator of the respective positions of the other aircraft relative to the own-ship aircraft 402 in real-time. The outer boundaries shown as the parachute plane jumper outer boundary 430 and the glider outer boundary 440 provide on the CDTI display 400 regions that are restricted for the aircraft 402 to cross.

In various exemplary embodiments, GPS data of glider 455 and the parachute jumper aircraft 415 can be provided to the navigation and autopilot systems of the aircraft for planning flight paths that deviated at the appropriate boundary distances from each outer boundary. In addition, the TCAS can receive GPS information of the outer boundaries to automatically change the flight path of the aircraft 402 to avoid an outer boundary that has suddenly been triggered due to a change in the squawk code of an aircraft in the vicinity of the current flight path of the aircraft 402.

In addition to position, the symbology representing the traffic may include various types of information. In particular, the traffic may include an aircraft ID, the relative altitude, and the change in relative altitude. For example, glider 455, which has an aircraft ID of "TRFC0008" is positioned approximately 2000 feet below the own-ship aircraft (as indicated by the "−20") and is moving vertically down (as indicated by the down arrow). Also, the squawk code label is displayed of "1202 GLIDE" which from the Table 1.1 indicates the XPDR code "1202" and the assigned usage of "Visual flight rules (VFR) glider operations for gliders not in contact with ATC. Also, shown is the outer boundary 440 in the same color as the inner boundary 450 of the glider 455; in this case it is a designated "Yellow" color. The outer boundary 440 is a circle with an epicenter of the glider 455. The outer boundary 440 is displayed in a dotted yellow perimeter line that is less accentuated in appearance than the inner boundary 450 which is perimeter line composed on line segments; in other words both the inner and outer boundary are visually distinguishable.

In various exemplary embodiment, the squawk code may be automatically changed by an autonomous drone aircraft and require an outer boundary. For example, the squawk code may be changed to transponder code 7400 indicating that the drone has lost its communication link. In such case, an outer boundary is required because the drone flight path may be uncertain and/or the drone may not be fully controlled to ensure the safety of aircraft flying in its vicinity.

In various exemplary embodiments, the squawk code can be triggered by a change in action, change of state or dangerous maneuver of the aircraft. For example, the parachute jumper aircraft (square 411) requires both an inner boundary 420 and an outer boundary 430 when performing a jumping operation. The outer boundary 430 is considerable in comparison to the outer boundary 440 of the glider 455. That is, each of the squawk codes can have outer boundary of a particular diameter that are defined by the aircraft operation, aircraft type, and/or emergency type requiring the change of the squawk code.

Typically, the operator continuously monitors the traffic display to maintain awareness about traffic. In addition, an outer ring or outer boundary 430 can be drawn to establish a possible safety zone. The dimensions of the ring can be varied depend on the criticality of the code. In an exemplary embodiment, for a glider type of aircraft not in contact with the ATC (Code 1202), the aircraft could be highlighted with a normal outer ring range and a corresponding aircraft color. In an alternate embodiment, an aircraft that is performing a function such as dropping parachutes (corresponding to UK code 0033, the squawk code) can be highlighted in a red color with a larger outer ring to provide maximum clearance for safety for each parachute jumpers. After the jump operation is completed, the UK code 0033 (i.e. the squawk) is changed back to a code indicative that the parachute dropping is no longer in progress and the highlighted ring can be changed from a red color and the larger outer ring would be reduced accordingly.

Figure 5:
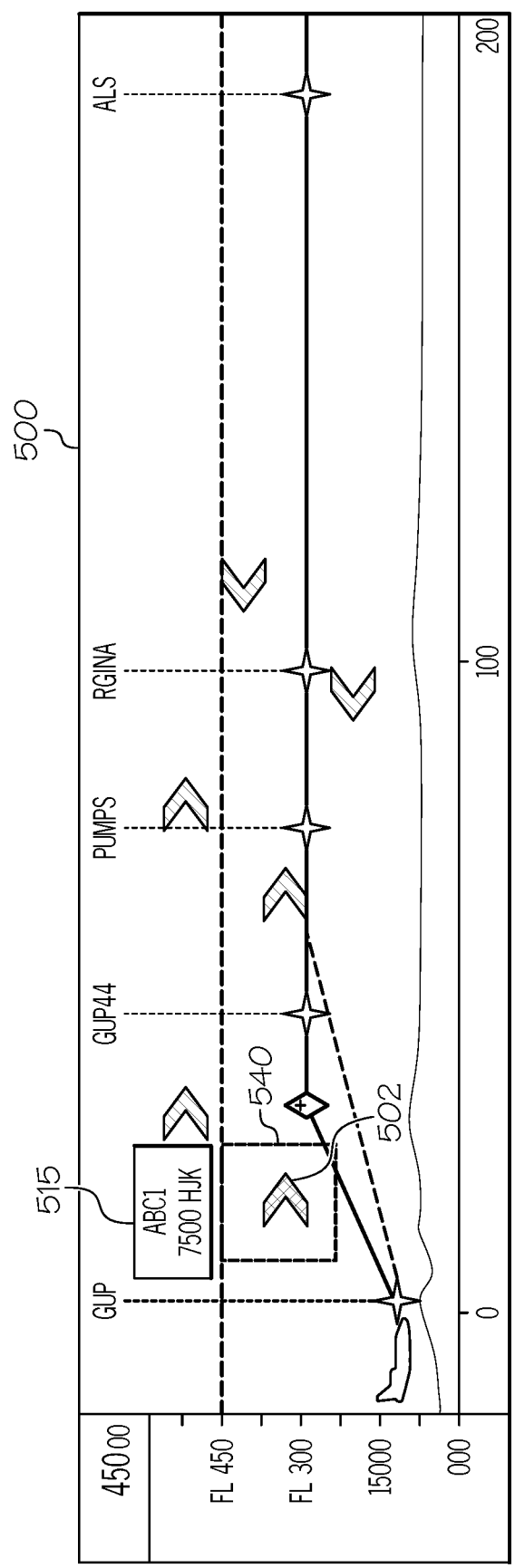
FIG. 5 is a traffic display rendered by the of the squawk code display system of FIG. 1 in a third scenario in accordance with an exemplary embodiment.

FIG. 5 is a traffic display rendered by the squawk code display system of FIG. 1 in a third scenario in accordance with an exemplary embodiment. In FIG. 5, a VSD display 500 shows an exemplary label for a transponder code 7500 indicating a hijacked aircraft. The transponder code 7500 includes the label 515 of "HJK" and the flight ID "ABCD1". In other words, the label 515 visually corresponds to the label on the other displays so there is no confusion. In addition, the aircraft symbol 502 is in red which is the same color of the label 515 and is surrounded by a vertical perimeter 540 to indicate the vertical region which is restricted around the aircraft symbol 502 due to the transponder code 7500 of a hijacking.

Figure 6:
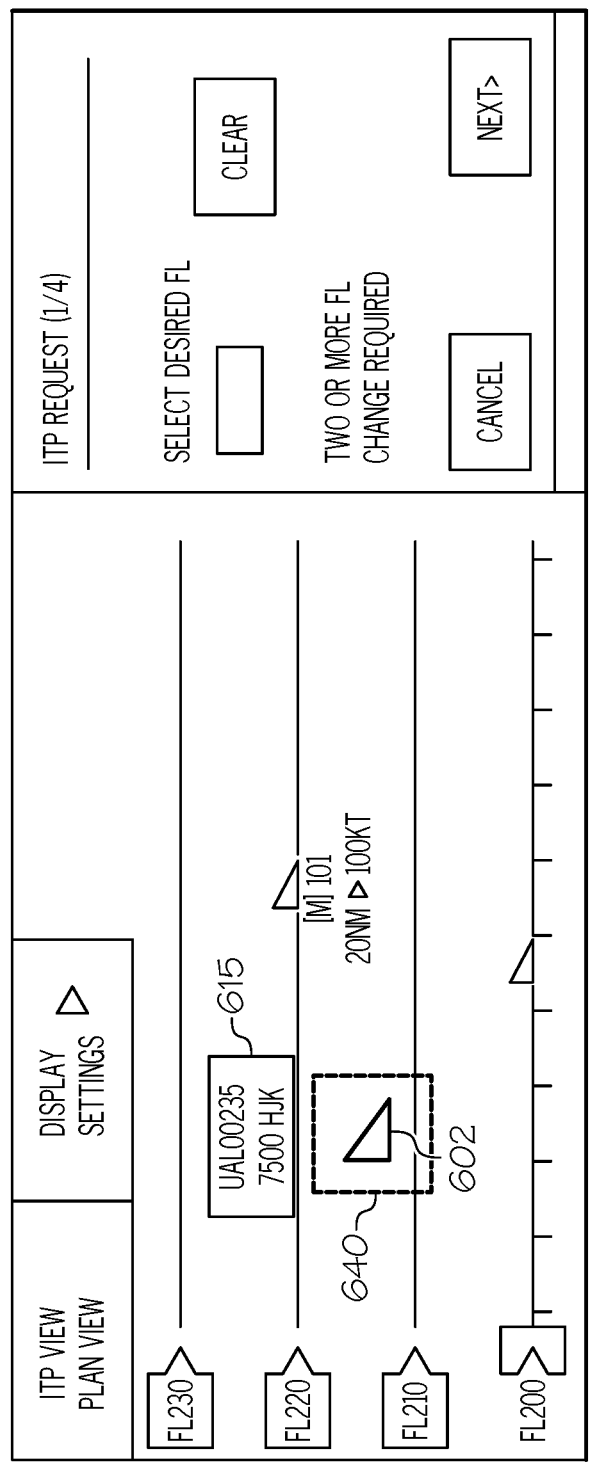
FIG. 6 is a traffic display rendered by the of the squawk code display system of FIG. 1 in a fourth scenario in accordance with an exemplary embodiment.

FIG. 6 is a traffic display rendered by the squawk code display system of FIG. 1 in a fourth scenario in accordance with an exemplary embodiment. FIG. 6 illustrates an ITP display of an aircraft 602 with special transponder (XPDR) codes. Like in FIG. 5, in display 600 of FIG. 6, there is shown an exemplary label for a transponder code 7500 indicating a hijacked aircraft. The transponder code 7500 includes the label 615 of "HJK" and the flight ID "ABCD1".

In other words, the label 615 visually corresponds to the label on the other displays so there is no confusion. In addition, the symbol of the aircraft 602 is in red which is the same color of the label 615 and is surrounded by a vertical perimeter 640 to indicate the vertical region which is restricted around the aircraft 602 due to the transponder code 7500 of a hijacking. In addition, to increase runway capacity, operations at some airports are based on a flight crew maintaining own separation from the preceding aircraft. The "Enhanced Visual Separation on Approach" application (VSA) displayed in display 600 is intended to enhance this type of operation. The objective is to safely execute approach procedures using own separation from the preceding aircraft more efficiently and possibly more regularly. In such scenarios, if the preceding aircraft goes in to a distress mode, the aircraft following may get in to a potentially unsafe situation. Providing the information of the preceding aircraft emergency situation to the following aircraft while executing the VSA will enhance the safety.

Accordingly, the exemplary embodiments discussed above provide a flight control system (In FIG. 1, 104) that effectively couples an aircraft's TCAS (In FIG. 1, 136) to its FMS 140 and receives additional perimeter boundary data of restricted and non-restricted airspace. The flight control system (FIG. 1, 104) capably evaluates approach procedure and runway geometries before automatically implementing the evasive maneuver; in doing so, a variety of limiting conditions can be identified. Limiting conditions on the evasive maneuver include, for example, a closely spaced parallel runway, and/or a location where there have been issues with previously performed evasive maneuvers.

Figure 7:
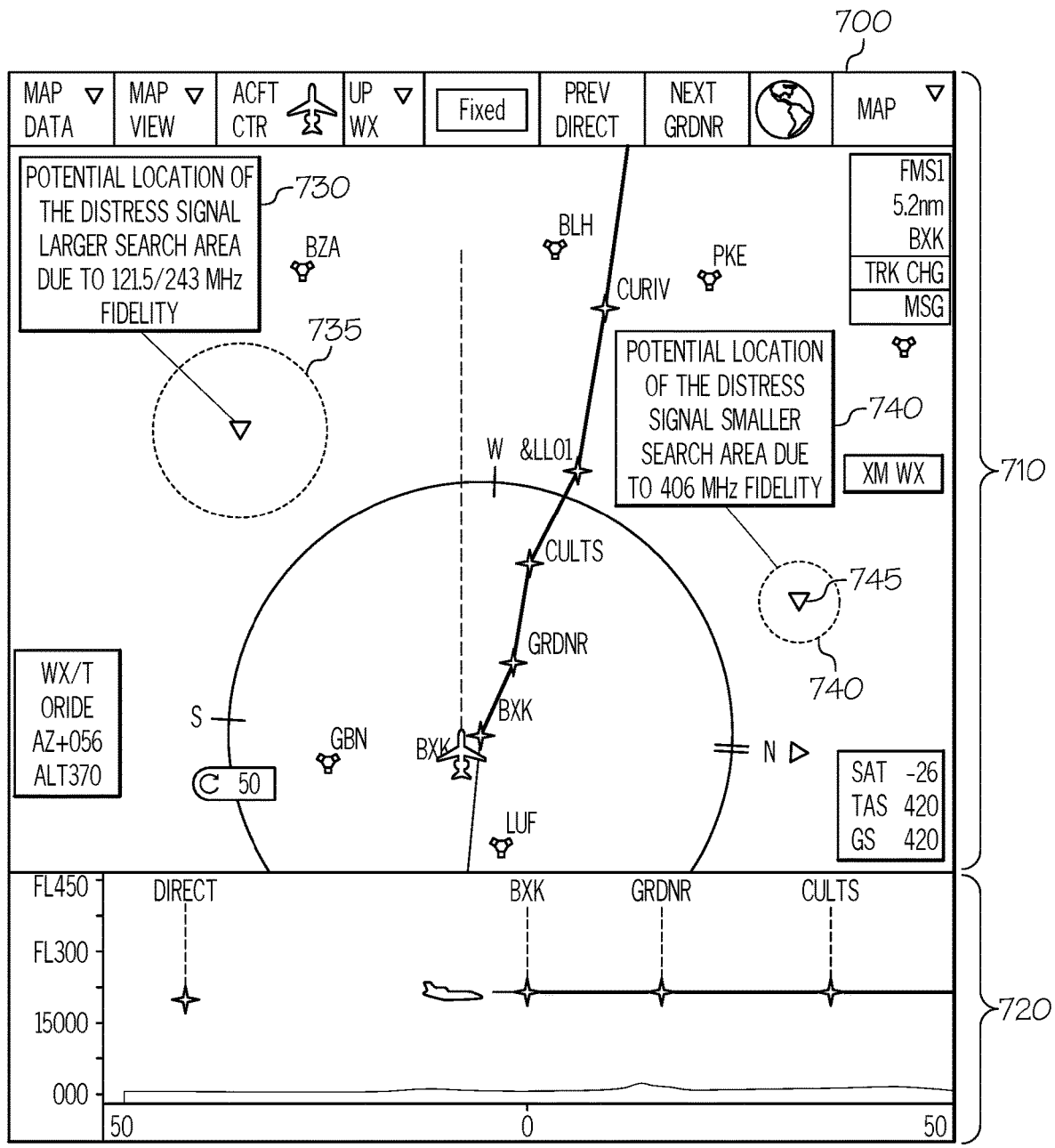
FIG. 7 is a traffic display rendered by the of the squawk code display system of FIG. 1 in a fifth scenario in accordance with an exemplary embodiment.

FIG. 7 is a traffic display rendered by the squawk code display system of FIG. 1 in a fifth scenario in accordance with an exemplary embodiment. In FIG. 7, a view of distress beacons is shown on a section of a map view 710 of the display 700. In addition, another section of a distress aircraft layer 720 is shown beneath the map view 710. The potential location of distress beacon 730 of a distress signal with a larger search area with perimeter boundary 735. The perimeter boundary 735 of the larger search area is based on a 121.5/243 MHz fidelity. The potential location of another distress beacon 745 with a smaller search area (in comparison to the search area of distress beacon 730) with a perimeter boundary 740. The distress aircraft (i.e. vehicle) layer 720 is an interactive layer that allows interactive cursor control by the input device (FIG. 1, 120). The distress aircraft layer 720 shows a dialog box that is displayed and provides corresponding information of contact information (i.e. phone numbers to call) for the aircraft, vehicle etc., descriptions of the aircraft, vehicle etc., airports and ports, and any additional useful information.

The display 700 displays the location of aircraft/vehicles/person that has activated a distress beacon via an Emergency Locator Beacon (ELT) which assigns a boundary perimeter on a map view 710 to aid in locating and searching for the aircraft, vehicle or person that has activated the ELT. In addition, if the ELT transmits on an antiquated or lower bandwidth of 121.5 or 243 MHz, this is indicative of an earlier model ELT in operation. Since the accuracy of the earlier model ETLs is considered lower, the perimeter boundary is automatically adjusted to account for a degree of inaccuracy or a lower overall accuracy that occurs in operation. That is the potential area defined by the perimeter boundary which is the area to be searched or to identify the distressed aircraft and because an accurate location of the distress beacon is not as refined; to make up for this inaccuracy, a larger search area by a larger perimeter boundary is defined on the display of the map view 710. That is, the display of the map view 710 is notified because of the realization of the antiquated EFT in operation and the perceived inaccuracy of the antiquated ELTs to map the perimeter boundary with a larger radius circle. The recent model ELTs are more accurate because the recent model ELTs can transmit on a higher bandwidth of 406 MHz that provides better accuracy enabling the defined search area to be significantly smaller yet still maintaining the same level of relevancy as a larger search area, based on less accurate locations measurements of the antiquated EFTs, to identify and locate the distressed aircraft.

Figure 8:
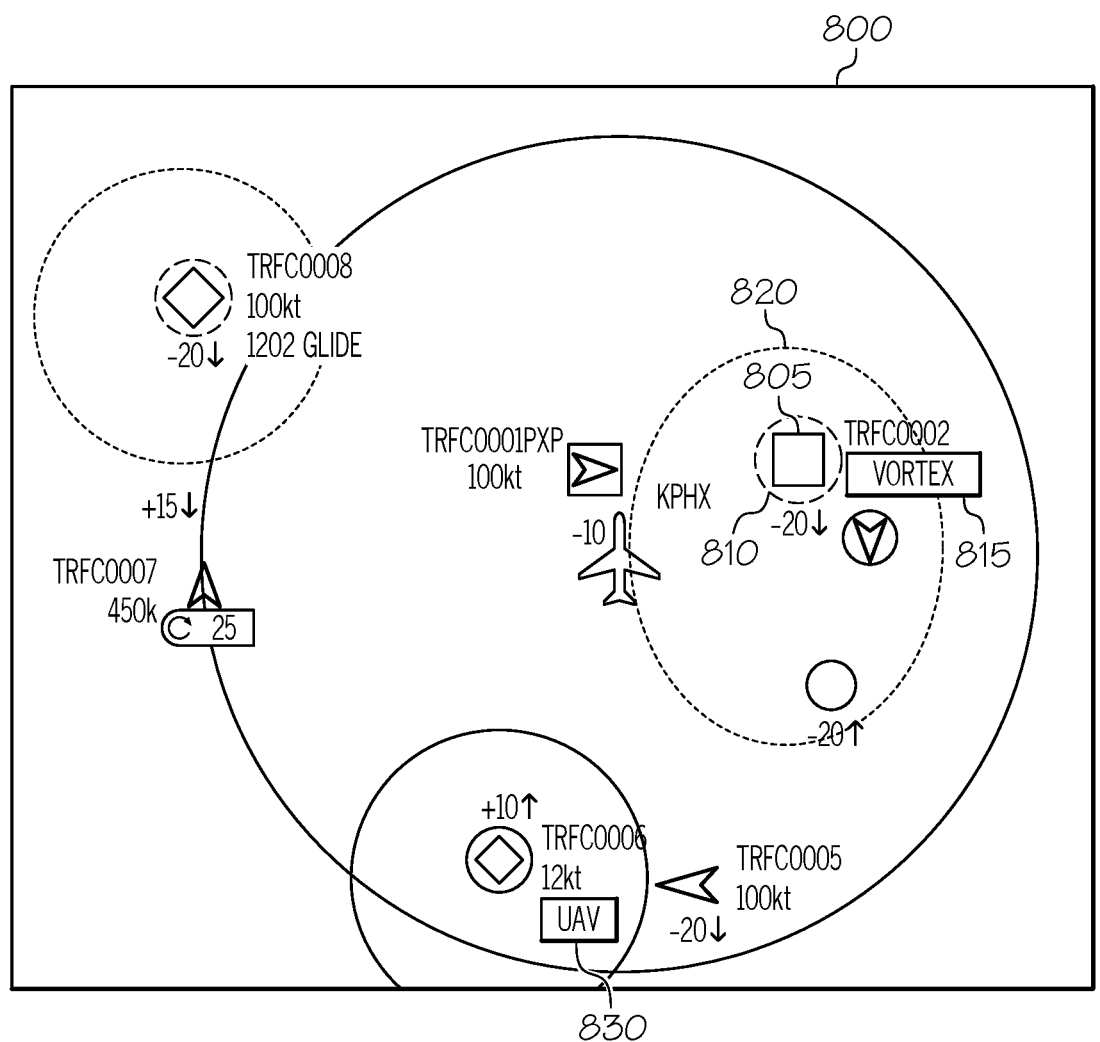
FIG. 8 is a traffic display rendered by the of the squawk code display system of FIG. 1 in a sixth scenario in accordance with an exemplary embodiment.

FIG. 8 is a traffic display rendered by the squawk code display system of FIG. 1 in a sixth scenario in accordance with an exemplary embodiment. In FIG. 8, another exemplary embodiment of similar display features of displaying a perimeter boundary, an icon and a label based on the ADS-B emitter category instead of on information associated with the squawk code. That is, the label information displayed is from the categories of the ADS-B equipped aircraft traffic. The labels and the perimeter that are highlighted are the "Emitter Categories" in Table 1.3 below. For example, the label "UAV" 830 is from the category "Unmanned Aerial vehicle" No. 9 of Table 1.3 below. The vortex airplane symbol 805 (square shaded in a red color), has an oval ring 820 surrounding as the outer perimeter boundary which illustrates a perimeter for the category of a "High vortex large aircraft" No. 4 (Table 1.3) and a label "VORTEX" 815 displayed for visual notice to the pilot. The oval ring differentiates the high vortex aircraft category from the aircraft category of the ADS-B. The inner boundary 810 defines the perimeter boundary of the high vortex aircraft.

All ADS-B equipped aircraft provides the type of traffic in the 'Emitter Category' in Table 1.3 below as follows:

TABLE 1.3

1. Light (ICAO)—7,000 kg (15,500 lbs.) or less
2. Small aircraft—7,000 kg to 34,000 kg (15,500 lbs. to 75,000 lbs.)
3. Large aircraft—34,000 kg to 136,000 kg (75,000 lbs. to 300,00 lbs.)
4. High vortex large aircraft (such as B-757)
5. Heavy aircraft (ICAO)—136,000 kg (300,000 lbs.) or more
6. Highly maneuverable (>5g acceleration capability) and high speed (>400 knots cruise)
7. Rotorcraft
8. Glider/Sailplane
9. Lighter-than-air
10. Unmanned Aerial vehicle
11. Space/Trans-atmospheric vehicle
12. Ultralight/Hang glider/Paraglider
13. Parachutist/Skydiver
14. Surface Vehicle—emergency vehicle
15. Surface Vehicle—service vehicle
16. Point obstacle (includes tethered balloons)
17. Cluster obstacle
18. Line obstacle When an emergency/distress or a special traffic of interest to the own ship is detected, the system will provide appropriate aural and visual alerts. The category information can be used to highlight the special ADS-B traffic. In various exemplary embodiments, the high speed and highly maneuverable traffic can be highlighted with a bigger range (perimeter) ring. Similarly, a high vortex airplane can have another range ring of an oval ring to further illustrate the vortex area as shown in FIG. 8. In addition, any drones or unmanned aerial vehicles can be separately highlighted with the label "UAV" 830 as shown in FIG. 8.

In various exemplary embodiments, the pilot can switch or toggle the display, to show aircraft traffic with the perimeter boundaries, labels, symbols in various colors based on 3 different types of input of the an input from (1) the squawk code, (2) the emergency locator beacon and/or (3) the ADS-B emitter category. That is, the pilot can by switching back and forth between each type of input, can enable a different visual view of the traffic on a traffic display map to enhance situation awareness based on visual comparisons of each scenario from each input displayed. Moreover, the flight control and other instrumentations can plan or change flight path based on each input. In various exemplary embodiments, the inputs can be prioritized to enable an optimum flight planning and visual awareness display to the pilot. In addition, the inputs can be selected based on the equipment aboard an aircraft and the stability and/or reliability of communications associated with each input.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for flight control with alerts depicted on a display device, the method comprising:
   receiving, by a processor of a host aircraft, data of at least a state of a neighboring aircraft wherein the neighboring aircraft state data comprises: transponder data;
   identifying, by the processor, a transponder code from the transponder data of the neighboring aircraft by using a transponder table that includes a plurality of locally stored transponder codes;
   determining, by the processor, at least perimeter data about the neighboring aircraft by identifying the transponder code associated with at least perimeter data from the transponder code table wherein each transponder code is designated with a particular perimeter about an aircraft in accordance with the transponder code;
   determining, by the processor, at least perimeter data based on data from an emergency locator beacon about the state of the neighboring aircraft instead of using the transponder data resulting in another set of perimeter data separate to transponder based parameter data;
   generating, by the processor, a perimeter from the perimeter data about the neighboring aircraft for the transponder code, or from the emergency locator beacon about the neighboring aircraft's state wherein the perimeter defines restricted airspace about the neighboring aircraft;
   selectively displaying, by the processor, on an air traffic map of a display device of the host aircraft, the neighboring aircraft with the perimeter based on the transponder code or emergency locator beacon displayed about the neighboring aircraft;
   processing, by the processor, state data of the host aircraft and the perimeter about the neighboring aircraft to identify a conflict between a trajectory of the host aircraft and restricted airspace about the neighboring aircraft;

selectively modifying, by the processor, one of the set including: a flight plan, a flight path, and a speed of the host aircraft responsive to identifying the conflict between a trajectory of the host aircraft and the restricted airspace defined by the perimeter about the neighboring aircraft; and
generating, by a graphic device coupled to the processor, different restricted airspace about the aircraft based on input data from an antiquated model emergency locator beacon and a newer model emergency locator beacon.

2. The method of claim 1, further comprising:
displaying, by the processor on the display device of the host aircraft, the air traffic map comprising: labels based on the transponder code associated with the host aircraft and the neighboring aircraft.

3. The method of claim 1, further comprising:
determining, by the processor, at least perimeter data based on data from an ADS-B emitter category about the state of the neighboring aircraft instead of by the transponder data.

4. The method of claim 1, further comprising:
creating, by the graphic device, the perimeter about the neighboring aircraft wherein the graphic device is coupled the processor to receive instructions for creating the perimeter and the display device for displaying the perimeter about the neighboring aircraft.

5. The method of claim 4, further comprising:
creating, by the graphic device, a symbol for each aircraft of a particular color and shape for visually distinguishing air traffic on the display device.

6. The method of claim 1, further comprising:
determining, by the processor, at least perimeter data based on data from one of a set of inputs comprising: the transponder data, an emergency locator beacon data, and an ADS-B emitter category data for displaying a perimeter in accordance with an input data about each aircraft on the display device.

7. The method of claim 1, further comprising:
generating a larger perimeter about each aircraft when data from the antiquated emergency locator beacon is used as apposed when data from the newer emergency locator beacon is used because the data from the antiquated emergency locator beacon is less accurate than the data from the newer emergency locator beacon.

8. A display system for an aircraft, the system comprising:
a display device;
a graphics device coupled to the display device for generating, on the display device, perimeters about an aircraft, an icon for an aircraft and a label for the aircraft; and
a control module operationally coupled to the display device and the graphics device, the control module configured to:
receive aircraft state data from aircraft sensors;
receive input data from a transponder of the aircraft;
process the aircraft state data and the transponder data to instruct the graphics device to generate at least a perimeter about the aircraft based on the transponder data wherein the transponder data comprises transponder codes;
receive the input data which comprise: emergency locator beacon data instead of the transponder data;
instruct the graphic device to generate on the display device the perimeter about the aircraft based on the emergency locator beacon data for the aircraft;
instruct the graphics device to generate restricted and unrestricted airspace about the aircraft based on the transponder data; and
generate different restricted and unrestricted airspace about the aircraft based on input data from an older model emergency locator beacon and a newer model emergency locator beacon.

9. The display system of claim 8, further comprising:
the control module configured to:
instruct the graphic device to generate on the display device a label based on the transponder code for the aircraft.

10. The display system of claim 8, further comprising:
the control module configured to:
receive input data which comprise: ADS-B emitter category data instead of the transponder data; and
instruct the graphic device to generate on the display device the perimeter about the aircraft based on the ADS-B emitter category data for the aircraft.

11. The display system of claim 8, further comprising:
the control module configured to:
instruct the graphic device to generate an icon and a label for the aircraft on the display device based on the emergency locator beacon data wherein the icon and the label visually reflect the input data from an emergency location beacon on the display device.

12. The display system of claim 10, further comprising:
the control module configured to:
instruct the graphic device to generate an icon and a label for the aircraft on the display device based on the input data of the ADS-B emitter category data wherein the icon and the label visually reflect the input data from the ADS-B emitter.

13. The display system of claim 8, further comprising:
the control module configured to:
instruct the graphic device to generate a larger perimeter about the aircraft when the input data is from the older model of an emergency locator beacon and a smaller perimeter about the aircraft when the input data is from the newer model of the emergency locator beacon to account for a lesser degree of accuracy of a location from the older model of the emergency locator beacon.

14. A method for identifying and displaying alerts of air traffic, the method comprising:
receiving input data to a processor of an aircraft wherein the input data comprises: distress, emergency, and special traffic data;
generating, by a graphic device coupled to the processor, restricted and unrestricted airspace about the aircraft based on the input data wherein the input data at least comprises emergency locator beacon data; and
displaying, by the graphic device, the restricted and unrestricted airspace on a display of the aircraft to view on a traffic map the restricted and unrestricted airspace for navigating the aircraft wherein the restricted and unrestricted airspace about the aircraft is based on input data from an aircraft transponder; and
generating, by the graphic device, different restricted and unrestricted airspace about the aircraft based on input data from an older model emergency locator beacon and a newer model emergency locator beacon.

15. The method of claim 14, further comprising:
generating, by a graphic device coupled to the processor, restricted and unrestricted airspace about the aircraft based on the input data from an ADS-B emitter.

16. The method of claim 14, further comprising:
  processing the transponder data by the graphic device to generate a range, a symbol, and a label for the aircraft on the display of the traffic map.

\* \* \* \* \*